MICROWAVE SWITCHING DEVICE EMPLOYING A REED SWITCH ELEMENT

Filed July 23, 1968 2 Sheets-Sheet 1

INVENTORS
TAKAJI KURODA
YOSHIMI TAGASHIRA
HIDEO NOMURA
BY
Hopgood & Calimafde
ATTORNEYS

MICROWAVE SWITCHING DEVICE EMPLOYING A REED SWITCH ELEMENT

Filed July 23, 1968 2 Sheets-Sheet 2

INVENTORS
TAKAJI KURODA
YOSHIMI TAGASHIRA
HIDEO NOMURA
BY
Hopgood & Calimafde
ATTORNEYS United States Patent Office 3,555,465

Patented Jan. 12, 1971

3,555,465

MICROWAVE SWITCHING DEVICE EMPLOYING A REED SWITCH ELEMENT

Takaji Kuroda, Yoshimi Tagashira, and Hideo Nomura, Tokyo, Japan, assignors to Nippon Electric Company, Limited, Tokyo, Japan, an organization of Japan Filed July 23, 1968, Ser. No. 746,821
Claims priority, application Japan, July 25, 1967, 42/48,316
Int. Cl. H01p *1/10, 1/20, 7/04*
U.S. Cl. 333—73 9 Claims

ABSTRACT OF THE DISCLOSURE

A microwave tuning circuit is described wherein a coaxial resonator which is electromagnetically coupled to the microwave circuit has an axial tuning element. The tuning element utilizes a series connected reed switch for electromagnetically controlling the resonator frequency and thereby the frequency response of the microwave circuit.

This invention relates generally to microwave switching devices and, more particularly, to a microwave switching device of the kind in which a reed switch employed as the switching control element.

The conventional mechanically controlled microwave switches, either manually operated or motor-operated, have such defects that switching speed is limited, and the structure is unavoidably complicated. Those conventional microwave switches which employ electronic or solid-state switching devices enable high speed switching, but nevertheless have some disadvantages, because their reliability is easily affected by a change in the ambient temperature, humidity, or in driving voltage.

The principal object of this invention is therefore to provide a mircowave switching device of high reliability and high switching speed.

The microwave switching device according to this invention has two portions, a main resonator and an auxiliary resonator portion electromagnetically coupled to each other. The main resonator, which may be formed of a section of a waveguide, is constructed in the form of a microwave switch. The auxiliary resonator is of the coaxial type. Along its axis, a reed switch is provided along with a solenoid for energization of the switch.

In the switching device of this invention, a reed switch is disposed in the coaxial type auxiliary resonator in such a manner that the reed switch provides a bridge intercoupling the main and auxiliary resonators and the switching energy is supplied to the solenoid surrounding the auxiliary resonator to on-off control the reed switch. On-off control of the reed switch changes the resonant frequency of the auxiliary resonator, and eventually changes the transmission characteristics (band-pass or band-rejection characteristics) of the main resonator through the electromagnetic coupling formed therebetween.

Employment of the reed switch as the switching element provides a switching time as short as one millisecond.

Compared with 500 to 600 milliseconds which was the shortest operation time that could be achieved by the use of a conventional mechanical microwave switching device, the corresponding switching time realizable by the microwave switching device of the present invention is extremely short.

Figure 1:
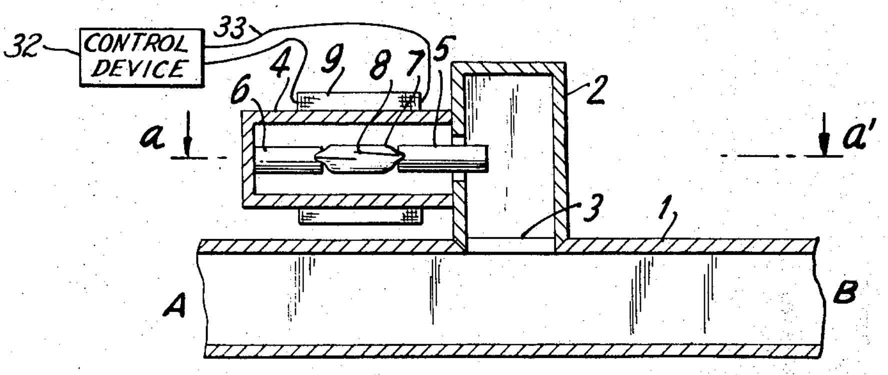
Figures 2, 3, 4:
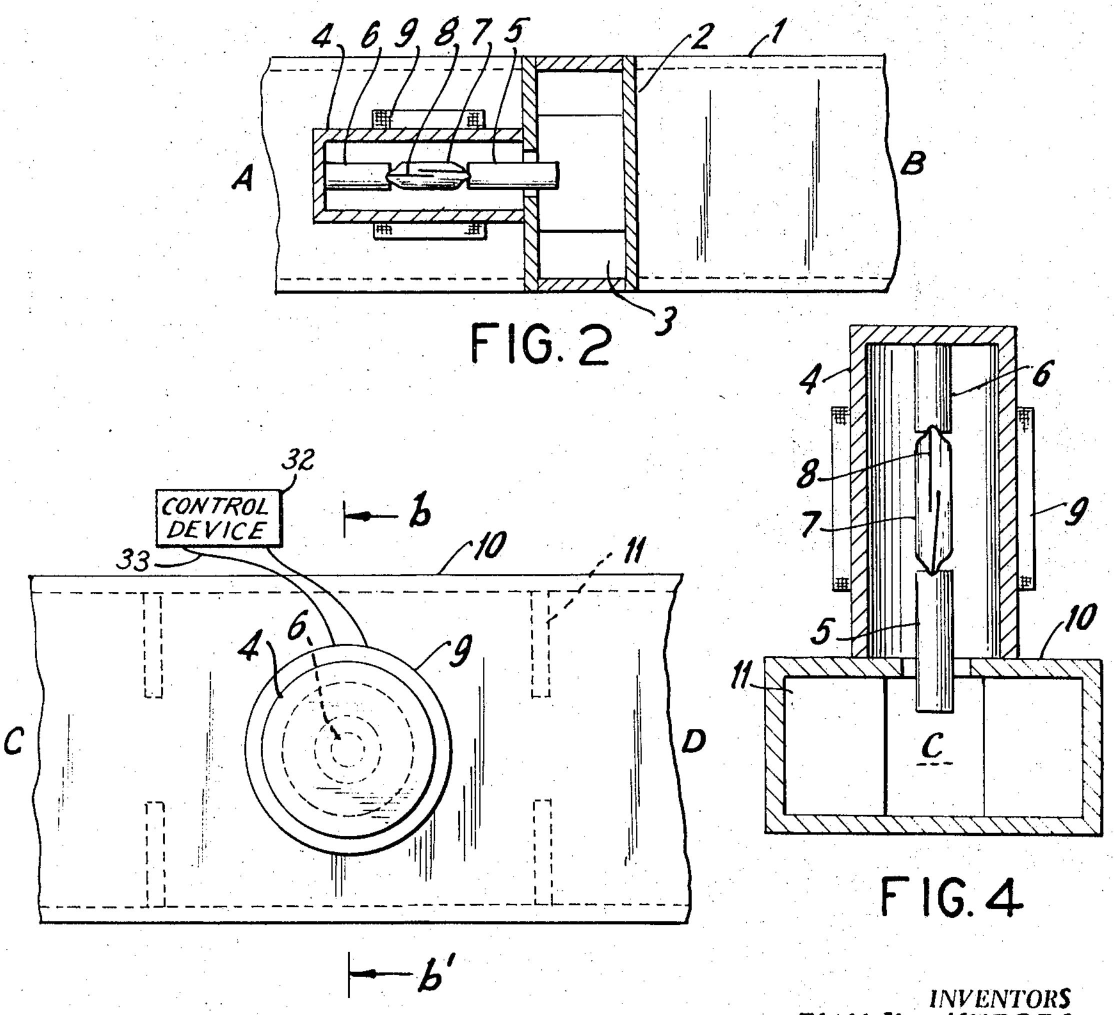
Figure 5:
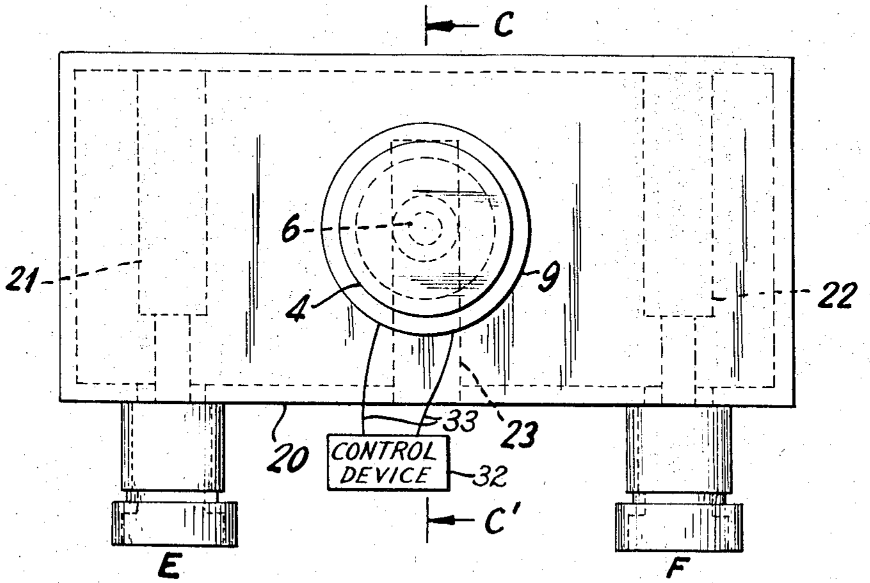
Figures 6, 7, 8, 9:
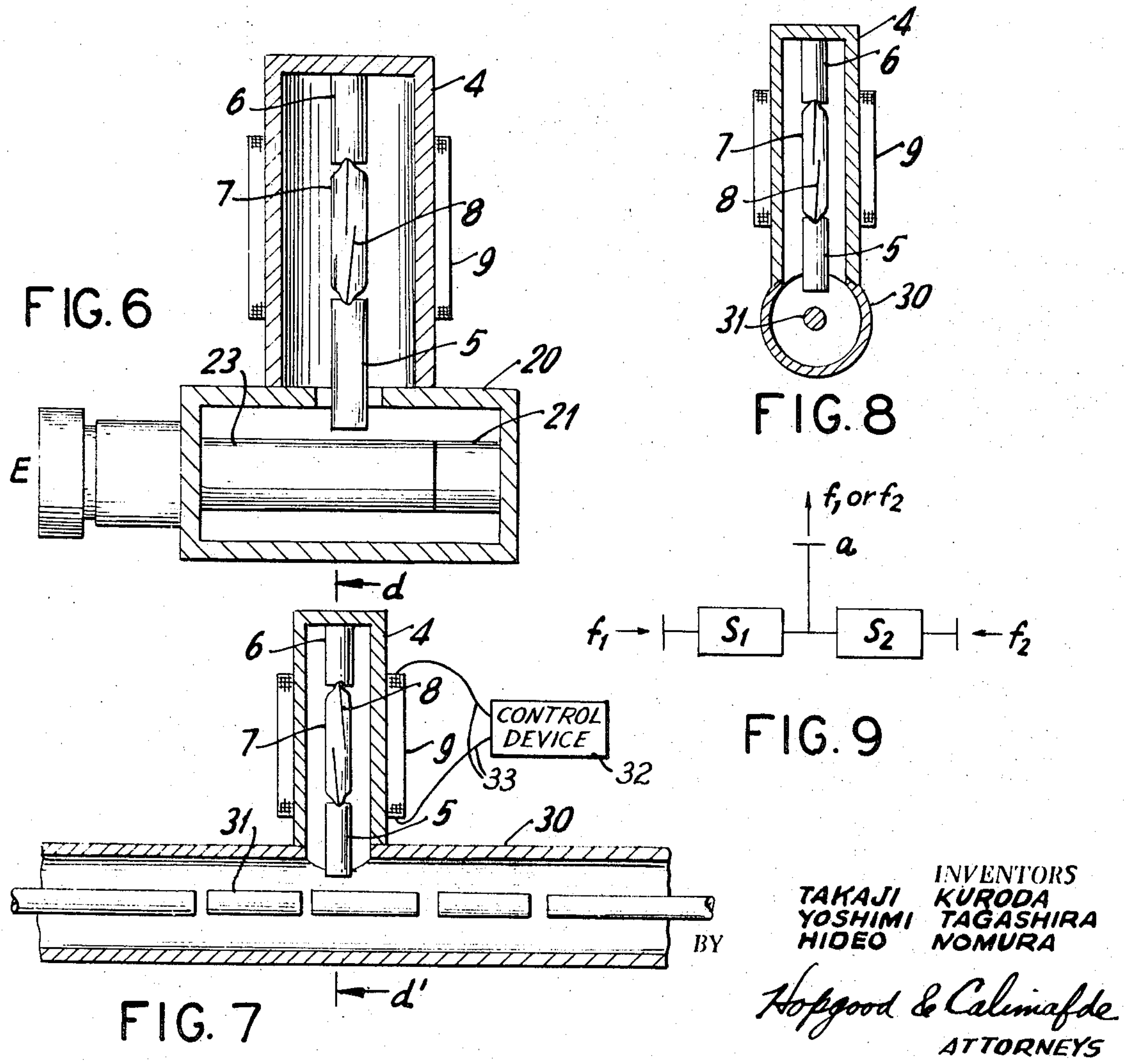

These and other objects and features of this invention will become apparent from the following description of preferred embodiments of this invention taken in connection with the accompanying drawings, in which:

FIG. 1 is a longitudinal cross-sectional view of a microwave switching device embodying this invention as integrated into a rectangular waveguide type band-rejection filter; FIG. 2 is a sectional plan view of the structure shown in FIG. 1 as viewed along the line *a–a'*; FIGS. 3 and 4 respectively show a plan view and a cross-sectional view as viewed along the line *b–b'* of a microwave switching device embodying this invention as integrated into a rectangular waveguide type band-pass filter; FIGS. 5 and 6 respectively show a plan view and a transverse cross-sectional view as viewed along the line *c–c'* of another embodiment of this invention applied to a comb-line type band-pass filter; FIGS. 7 and 8 respectively are longitudinal and transverse cross-sectional views taken along the line *d–d'* of still another embodiment of this invention applied to a coaxial type band-pass filter; and FIG. 9 is a schematic circuit diagram illustrating an example of the application of this invention.

Referring to FIGS. 1 and 2, the reference numeral 1 denotes a rectangular waveguide, 2 a cavity resonator portion, and 3 a resonant aperture for coupling the rectangular waveguide to the cavity resonator portion. These numerals 1, 2, and 3 designate, in combination, the main resonator section.

4 denotes a coaxial type auxiliary resonator, 5 and 6 two segments of a central conductor one of which is protruding into the resonator portion through a restricted opening, and 7 a reed switch connected across the two segments of the central conductor. The reference numeral 8 designates the reeds of the reed switch, and 9 a solenoid for producing a magnetic field along the reed switch to set the reeds 8 into a "make" or "break" condition. A control device 32 is connected to solenoid 9 through leads 33 to supply the solenoid with a control signal for actuating the reed switch.

It will be seen that the rectangular waveguide 1 and the cavity resonator portion 2 serve, in combination, to define a band-rejection filter and that the coaxial type auxiliary resonator 4 is electromagnetically coupled to the main resonator section 1, 2, and 3 through the central conductor.

Assume that this microwave circuit is tuned as a whole to a resonant frequency $f_0$ to bring waveguide 1 into the state of "band-rejection" mode when the reeds are opened. Then, closing of the reeds, with the solenoid energized by the control signal, the resonant frequency is caused to shift from frequency $f_0$ to $f_0'$. As a result, the attenuation of the microwaves centered at frequency $f_0$ decreases, with the result that the rectangular waveguide 1 is tuned out of "band-rejection" state. Actually, the microwave energy around frequency $f_0$ is allowed to pass through. In such a manner, the flow of microwave energy from terminal A to terminal B is controlled by the switch-on and off operation of the reed switch 7.

In FIGS. 3 and 4 which illustrate another embodiment as combined to a band-pass filter of the rectangular waveguide type, the numeral 10 designates a rectangular waveguide, 11 a resonant aperture, 10 and 11 waveguide wall members forming the cavity resonator for the band-pass filter, and 4 a coaxial auxiliary resonator composed of constituent parts 5, 6, 7, 8, and 9 which are substantially the same as those shown in FIG. 1.

It will be assumed referring to FIG. 4 that the band-pass filter is tuned to resonant frequency $f_0$ when the reeds 8 are opened. Under this condition, the microwaves having frequency components around frequency $f_0$ are transmitted in the direction C→D with no substantial attenuation. Upon the closing of the reeds 8, the resonant frequency $f_0$ of the band-pass filter shifts to a frequency $f_0'$. Then the microwaves having components around frequency $f_0$ are almost reflected. Thus the switching operation of the reed switch 7 brings the microwaves into the "on" and "off" state. Thus, this device serves as a microwave switch.

In FIGS. 5 and 6 which illustrate still another embodiment applied to a comb-line type band-pass filter, the numeral 20 denotes a comb-line type band-pass filter which forms the main resonator, 21 an input coupling rod, 22 an output coupling rod, and 23 a resonator rod. As in the embodiment of FIGS. 3 and 4, the auxiliary coaxial resonator 4 is composed of similar constituent parts to those shown in FIGS. 1 or 2. This microwave switch serves as a similar switching device to those mentioned above. To describe briefly, the microwave transmission in the direction E→F is controlled by the switching of the reed switch.

In FIGS. 7 and 8 which illustrate a further embodiment of the invention as integrated into a coaxial type band-pass filter, the numeral 30 designates a coaxial type band-pass filter which forms the main resonator section, 31 a resonator rod, and 4 an auxiliary coaxial resonator having similar structure to those mentioned above. The switching operation of this coaxial type band-pass filter is quite similar to those of the examples mentioned with reference to FIGS. 3 and 4.

All of the microwave switch structures embodying this invention as illustrated in FIGS. 1 through 8 are the same in that they consist of a main resonator section and a coaxial type auxiliary resonator section which is electromagnetically coupled to the main resonator section. It will be obvious to those skilled in the art however that, instead of the electric coupling illustrated, magnetic coupling can be employed between the two resonator sections with only a slight modification. For example, magnetic loop coupling means may be employed in place of electric coupling. The description and illustration of such known magnetic coupling and as applied to these microwave switch devices are omitted here for simplicity.

Moreover, though not particularly mentioned, still another structure is conceivable, such that the auxiliary resonator having a similar structure to those mentioned above is mounted within the main resonator section of a microwave stripline.

Among a variety of applications that are conceivable as to the present microwave switch device, a typical example is illustrated in FIG. 9 in block form. In this drawing, the present microwave switching device $S_1$ and $S_2$ constitutes a complete switching device in the two arms of a T-branch composed of a waveguide, and a coaxial line (or stripline). This circuit operates as a whole in such a way that when either of the switches $S_1$ and $S_2$ is opened the other is closed. This will enable the selective transmission of the microwaves of frequencies $f_1$ and $f_2$ to the branch *a*.

While the principles of this invention have been described above in connection with specific embodiments thereof, it is to be clearly understood that they are described by way of examples and are not to be construed as limitations of the scope of this invention.

What is claimed is:

1. A microwave switching device comprising a frequency selective microwave circuit having an input and an output for the transmission therethrough of a microwave signal including frequency components centered at the resonant frequency of said circuit, a coaxial auxiliary resonator having an axial inner conductor and electromagnetically coupled to said circuit, a reed switch inserted into said auxiliary resonator in place of a portion of the axial conductor, and means for applying a magnetic field to said reed switch in response to a switching signal whereby the resonant frequency of said circuit is changed by the on and off states of said reed switch to transmit or reject said microwave signal supplied to said microwave circuit at said input.

2. The device as recited in claim 1, wherein said frequency selective microwave circuit is a waveguide section with susceptance element disposed therein to form a filter for said microwave signal.

3. The device as recited in claim 1, wherein said frequency selective circuit includes a filter section including a microwave input coupling rod, a microwave output coupling rod, and a microwave resonator rod in electromagnetic coupling relationship therewith.

4. The device as recited in claim 1, wherein said frequency selective microwave circuit is a coaxial cable.

5. The device as recited in claim 1, wherein said inner conductor protrudes for an electromagnetically coupling distance into the frequency selective microwave circuit.

6. A microwave switching device comprising a microwave waveguide circuit for the transmission of microwave energy at a predetermined frequency, a resonator cavity effectively electromagnetically coupled to the waveguide at an intermediate location thereof to assert control over the microwave transmission, said resonator having principal and auxiliary sections, said auxiliary section having an inner tuning conductor shorted at one end thereof and electromagnetically coupled to the microwave energy in the waveguide to provide variable resonances of the resonator cavity in the predetermined frequency of the microwave energy, a reed switch interposed in series with the inner conductor for altering the resonating frequency of the resonator cavity depending upon the condition of the switch, and means for applying a magnetic field to said reed switch in response to a control signal for altering the condition of the reed switch and the resonating frequency of the cavity to control the microwave energy transmission in the waveguide.

7. The device as recited in claim 6 wherein said inner conductor protrudes for an electromagnetically coupling distance into the waveguide.

8. The device as recited in claim 6 wherein the cavity is a coaxial resonator cavity and said inner conductor is concentrically located therein and shorted to the cavity at an axial end thereof.

9. The device as recited in claim 8 wherein said reed switch is positioned substantially in the axially centered location of the inner conductor.

References Cited

UNITED STATES PATENTS

| | | | |
|---|---|---|---|
| 2,264,124 | 11/1941 | Schreiner | 333—7X |
| 2,396,044 | 3/1946 | Fox | 333—7 |
| 2,491,971 | 12/1949 | Hall et al. | (333—98S) |

HERMAN K. SAALBACH, Primary Examiner

P. L. GENSLER, Assistant Examiner

U.S. Cl. X.R.

333—7, 82, 97, 98